(12) United States Patent
Loo et al.

(10) Patent No.: US 7,227,678 B2
(45) Date of Patent: Jun. 5, 2007

(54) AIR GAPS FOR OPTICAL APPLICATIONS

(75) Inventors: Leslie S. S. Loo, Cambridge, MA (US); Michal Lipson, Waltham, MA (US); Karen K. Gleason, Lexington, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 422 days.

(21) Appl. No.: 10/179,055

(22) Filed: Jun. 25, 2002

(65) Prior Publication Data

US 2005/0052722 A1   Mar. 10, 2005

Related U.S. Application Data

(60) Provisional application No. 60/300,679, filed on Jun. 25, 2001.

(51) Int. Cl.
   *G02F 1/03*   (2006.01)
(52) U.S. Cl. ...................................... 359/260
(58) Field of Classification Search ................ 359/260, 359/245, 248, 254, 267; 385/123–132, 14, 385/15
   See application file for complete search history.

(56) References Cited

U.S. PATENT DOCUMENTS

| | | | |
|---|---|---|---|
| 5,461,003 A | | 10/1995 | Havemann et al. |
| 5,471,180 A | | 11/1995 | Brommer et al. |
| 5,629,951 A | | 5/1997 | Chang-Hasnain et al. |
| 5,641,709 A | * | 6/1997 | Lee ................. 438/3 |
| 5,726,805 A | | 3/1998 | Kaushik et al. |
| 6,018,421 A | | 1/2000 | Cushing |
| 6,040,937 A | | 3/2000 | Miles |
| 6,380,106 B1 | * | 4/2002 | Lim et al. ............ 438/778 |
| 6,610,593 B2 | * | 8/2003 | Kohl et al. ........... 438/623 |
| 6,785,458 B2 | * | 8/2004 | Mule' et al. .......... 385/131 |
| 6,788,867 B2 | * | 9/2004 | Mule' et al. .......... 385/129 |
| 6,807,352 B2 | * | 10/2004 | Mule' et al. .......... 385/131 |
| 6,947,651 B2 | * | 9/2005 | Mule' et al. .......... 385/125 |
| 2003/0012539 A1 | * | 1/2003 | Mule' et al. .......... 385/129 |
| 2003/0122229 A1 | * | 7/2003 | Bakir et al. ........... 257/678 |
| 2004/0084774 A1 | * | 5/2004 | Li et al. .............. 257/758 |

FOREIGN PATENT DOCUMENTS

WO   WO 98/14804   4/1998

(Continued)

OTHER PUBLICATIONS

"Single-Mode Photonic Band Gap Guidance of Light in Air," Cregan et al. *SCIENCE*. Sep. 3, 1999. vol. 285.

(Continued)

*Primary Examiner*—Ricky Mack
*Assistant Examiner*—Tuyen Tra
(74) *Attorney, Agent, or Firm*—Gauthier & Connors LLP

(57) ABSTRACT

An optical structure includes a substrate having two side surfaces. A first layer of high refractive index material is formed on the substrate. A sacrificial layer is formed on the first layer. A second layer of high refractive index material is formed on the sacrificial layer. At a predefined temperature the sacrificial layer is evaporated, thus forming an air gap between the first layer and the second layer.

15 Claims, 3 Drawing Sheets

FOREIGN PATENT DOCUMENTS

| WO | WO 98/32169 | 7/1998 |
|----|-------------|--------|
| WO | WO 99/23190 | 5/1999 |

OTHER PUBLICATIONS

"Fabrication of multi-air gaps InP based microstructures for widely tunable optical filters," Spisser et al. *SPIE*, Mar.-Apr. 1999, vol. 3680.

"Highly Selective and Widely Tunable 1.55- μm InP/Air-Gap Micromachined Fabry-Perot Filter for Optical Communications," Spisser et al. *IEEE Photonics Technology Letters*. Sep. 1998. vol. 10.

"Polysilicon air-bridge thermal sensor coupled to log-periodic antenna for infrared detection." Chong et al. *Microelectronic Engineering*. 1998. p. 473-476.

"Photonic-bandgap microcavities in optical waveguides," Foresi et al. *NATURE*. Nov. 13, 1997. vol. 390.

"Optical Filters from Photonic Band Gap Air Bridges," Chen et al. *IEEE Journal of Lightwave Technology*. Nov. 1996. vol. 14, No. 11.

"Air-bridge microcavities," Villeneuve et al. *Applied Physics Letters*. Jul. 10, 1995. p. 67.

"A Photonic Parallel Memory with Air-Bridge Interconnections for Large Scale Integration," Chino et al. *IEEE Photonics Technology Letters*. May 1993. vol. 5, No. 5.

"InP-based MOEMS and related topics," Leclercq et al. *Laboratoire d'Electronique,, Optoelectronique et Microsystemes*. Dec. 8, 1999. p. 287-292.

"Highly Selective and Widely Tunable 1.55- μm InP/Air-Gap Micromachined Fabry-Perot Filter for Optical Communications," Spisser et al. *IEEE Photonics Technology Letters*. Sep. 1998. vol. 10, No. 9.

"Reduced Capacitance Interconnect System Using Decomposition of Air Gap Filler Material," *IBM Technical Disclosure Bulletin*. Sep. 1995. vol. 38, No. 09.

* cited by examiner

AIR GAPS FOR OPTICAL APPLICATIONS

PRIORITY INFORMATION

This application claims priority from provisional application Ser. No. 60/300,679 filed Jun. 25, 2001.

BACKGROUND OF THE INVENTION

The invention relates to the field of optical structures, and in particular to a technique for air gap formations.

Light manipulation is integral for optical communications, and includes functions such as filtering, switching, and light guiding. These functions are obtained by using various optical structures, such as filters, switches, and photonic band gaps. The degree of light manipulation depends on the index of refraction contrast between the materials used in the various optical structures.

Air gaps open the possibility for obtaining very high index of refraction contrast. The implementation of air gaps has been very difficult due to the difficulty in fabrication. Currently, air gaps are formed using bonding techniques and etching of a sacrificial layer. These techniques form structures that are open to water molecules or other impurities, which limit the performance of optical devices, and do not allow large gap formations. Furthermore, optical structures with large areas are not allowed using the previously described techniques, due to the stress formed in the optical structures.

SUMMARY OF THE INVENTION

According to one embodiment of the invention, there is provided an optical structure. The optical structure includes a substrate. A first layer of high refractive index material is formed on the substrate. A sacrificial layer is formed on the first layer. A second layer of high refractive index material is formed on the sacrificial layer. At a predefined temperature the sacrificial layer is decomposed, thus forming an air gap between the first layer and the second layer.

According to another embodiment of the invention, there is provided a method of forming an optical structure. The method includes providing a substrate. A first layer is formed of high refractive index material on the substrate. The method also includes forming a sacrificial layer on the first layer. A second layer of high refractive index material is formed on the sacrificial layer. At a predefined temperature the sacrificial layer is decomposed. The method further includes forming an air gap between the first layer and the second layer.

According to another embodiment of the invention, there is provided a hollow filter. The filter includes a first elongated high refractive index layer. A sacrificial layer is formed on the first elongated high refractive index layer. A second high refractive index layer is formed on the sacrificial layer. At a predefined temperature the sacrificial layer is decomposed, thus forming an elongated air gap structure between the first elongated high refractive index layer and the second high refractive index layer. The filter is designed for filtering out electromagnetic signals of a specified frequency.

DETAILED DESCRIPTION OF THE INVENTION

Figure 1A:
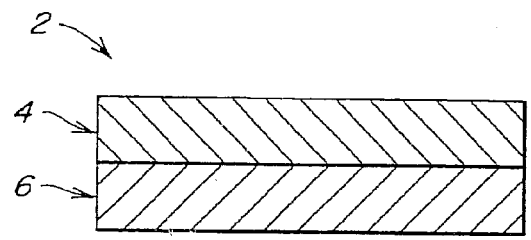
FIGS. 1A–1D are schematic flow process diagrams used in developing an air gap structure.

FIGS. 1A–1D are schematic flow process diagrams used in developing an air gap structure. FIG. 1A shows a structure 2, which includes a silicon substrate 6 and a high refractive index layer 4. In this embodiment, the high refractive index layer 4 is a silicon dioxide ($SiO_2$) layer and has a thickness of 2500 Å, however, this thickness can vary in other embodiments. Other types of high refractive index materials can be used in accordance with the invention. The high refractive index layer 4 is deposited on the silicon substrate 6 through conventional pulsed plasma enhanced vapor deposition (PECVD) technique at 200 mTorr. Other deposition techniques can be used to deposit silicon dioxide on the substrate 6.

The flow rates of the incoming gases are 8 standard cubic centimeters per minute (sccm) of methysilane, 8 sccm of oxygen, and 8 sccm of Ar. The plasma is operated at 100W with a 20 ms on-time and 20 ms off-time duty cycle. In other embodiments, the flow rates can be higher or lower depending on the amount of silicon dioxide needed on the substrate, and the plasma can be operated with a higher or lower on-time and off-time duty cycle. Also, the operation power of the plasma can also be adjusted based on the user needs.

Figure 1B:
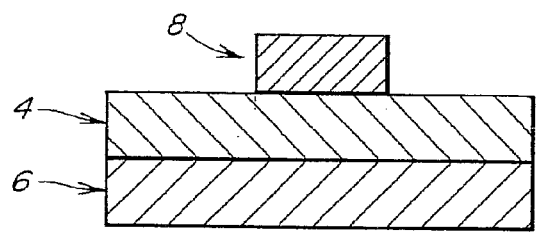

Afterwards, a copper mask with lines of 1 cm width is placed on the high refractive index layer 4 in preparation for depositing and development of a sacrificial layer 8, as shown in FIG. 1B. A hot filament chemical vapor deposition (HFCVD) method is employed in this process. First, a mixture of heated trioxane and nitrogen gas is introduced into a reactor chamber at a pressure of 10 Torr. The flow rates are 415 sccm for trioxane and 283 sccm for nitrogen gas, respectively. These flow rates can be varied. This gas mixture is passed through a heated filament array consisting of twenty 11.4 cm lengths of nichrome (80% nickel and 20% chromium) wire spaced 0.7 cm apart and situated 0.6 cm above the silicon substrate 6 with the copper mask, both of which are placed on a horizontal stage. The filament temperature is 700° C., and causes trioxane to decompose cleanly into formaldehyde gas. The silicon substrate 6 is cooled through backside cooling to temperatures between −20° C. and 50° C. Upon contacting the cooled surface of the high refractive index layer 4, the formaldehyde underwent polymerization to form a thin film of polyoxymethylene, which is the sacrificial layer 8.

The sacrificial layer 8 of polyoxymethylene is distributed on a portion of the high refractive index material 4. In other embodiments, one can pattern the sacrificial layer 8 by selecting certain regions on the high refractive index layer 4 or deposit a blanket layer of polyoxymethylene or the like, and then patterned that layer into selective regions on the high refractive index layer 4.

Figure 1C:
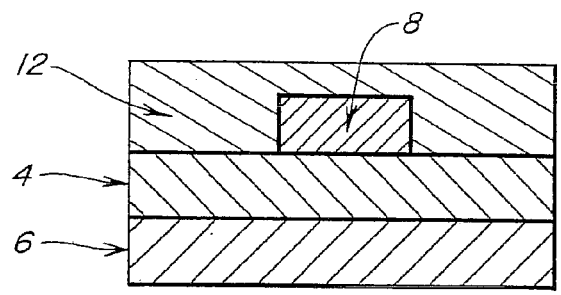

The copper mask is then removed and the PECVD process, as shown in FIG. 1C, deposits a second high refractive index layer 12 of silicon dioxide.

Figure 1D:
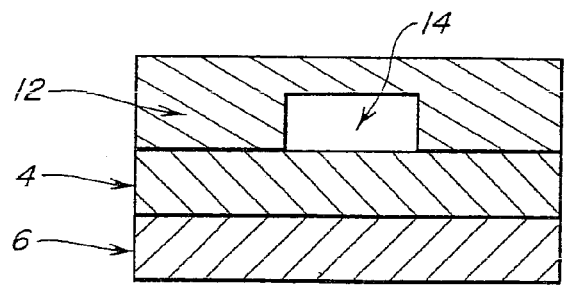

In order to remove the sacrificial layer 8, the substrate 6 is placed in a flat ceramic plate in vacuum to be baked. Then the temperature of the substrate 6 is raised to 200° C. at a rate of 1-2° C./min, and then maintained at 200° C. for 30 min. The polyoxymethylene thin film layer 8 decomposes at this temperature to formaldehyde gas, which escapes from the upper high refractive index layer 12 leaving behind an air gap structure 14 between the two high refractive index layers 4 and 12, as shown in FIG. 1D. Also, the thin film 8 can be partially decomposed, thus forming a partial air gap. By trimming the partial air gap, one can meet a certain optical specification.

After the baking procedure, the sample is hermetically closed making difficult the penetration of impurities and water molecules, which can degrade performance of the optical devices. Also, negligible residue is left behind after baking resulting from the decomposition of the sacrificial layer 8.

A modulator can also be attached to the optical structure 2 to deform the air gap structure 14, so that the performance of the optical structure 2 can be dynamically altered.

Figure 2A:
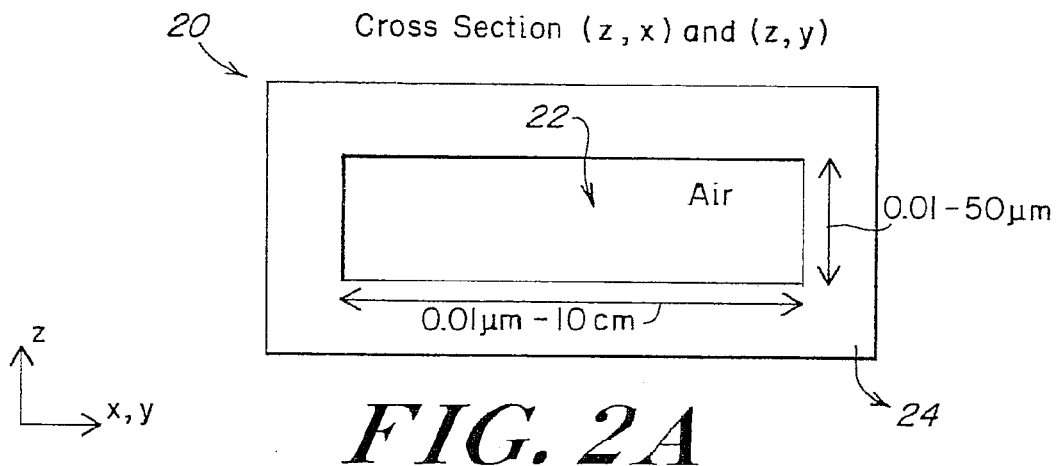
FIGS. 2A–2B are schematic diagrams of air gaps viewed at different positions.
Figure 2B:
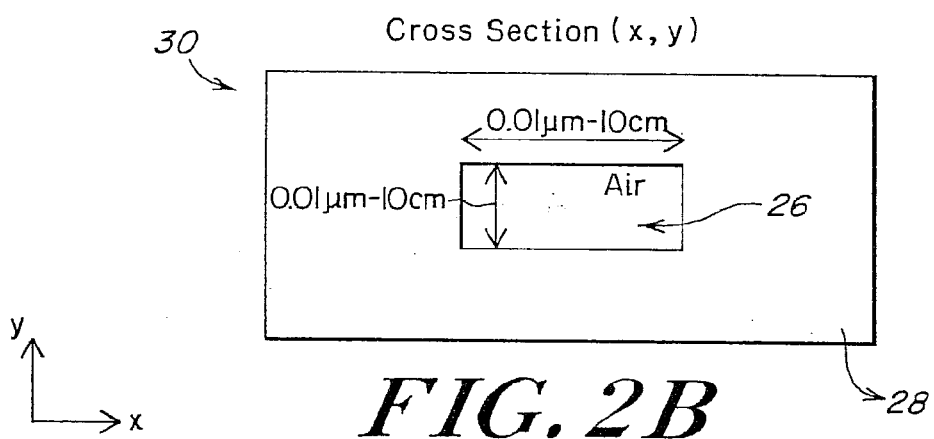

FIGS. 2A-2B are schematic diagrams of air gaps viewed at different positions. The inventive technique allows the formation of air gaps between 0.01-50 microns. These types of optical structures can be fabricated on a very small scale for optical purposes, such as band gaps. The technique can also allow fabrication on a very large scale for high yield purposes. These structures are completely closed as shown in FIGS. 2A and 2B. New optical structures can be formed using the invention, such as an optical filter with a low number of layers, optical switches operating at very low powers, bio-sensors, and a 3D photonic band gap.

FIG. 2A shows an optical structure 20 that includes an air gap 22 and hermetic high refractive index outer layers 24. The steps discussed above in FIGS. 1A-1D form the hermetic high refractive index outer layer 24. Also, FIG. 2A represents a vertical cross-section of an optical structure with the air gap 22 formed using the invention. The width of the air gap 22 is between 0.01-50 microns, and the length is between 0.01 microns and 10 cm. The optical structure 20 consists of dimensions used in both very small scale and large scale fabrications of optical structures. The invention allows for selective dimensions of the air gaps without limiting the performances of their respective optical devices. Prior art methods would not have allowed a length to be in that range, because it surpasses the requirement that all dimensions of an air gap be between 0.01 and 50 microns.

FIG. 2B shows an optical structure 30 that includes an air gap 26 and a hermetic high refractive index outer layer 28. FIG. 2B is a horizontal cross-sectional view of the optical structure 30. As discussed above regarding the hermitic high refractive index outer layer 24, the hermitic high refractive index outer layer 28 is formed in the same fashion. The air gap 26 includes a width sized between 0.01 microns and 10 cm and a length sized between 0.01 microns and 10 cm. Therefore, some of the dimensions allowed in this air gap 26 surpass those for very small scale fabrication. This optical structure 30 can be used in very large scale for high yield purposes, and there is little stress on the optical structure 30 which can hinder performance, as in the prior art.

Both of the optical structures 20 and 30 prevent impurities and water molecules to enter the air gaps 22 and 26, respectively. These structures 20 and 30 can be used to make large scale optical devices, such as optical filters and switches. Another important aspect of the invention is that these structures 20 and 30 are not made using bonding techniques and etching of a sacrificial layer. This effectively makes the optical structures 20 and 30 more reliable under high yield use, which is not attainable in the prior art.

Figure 3:
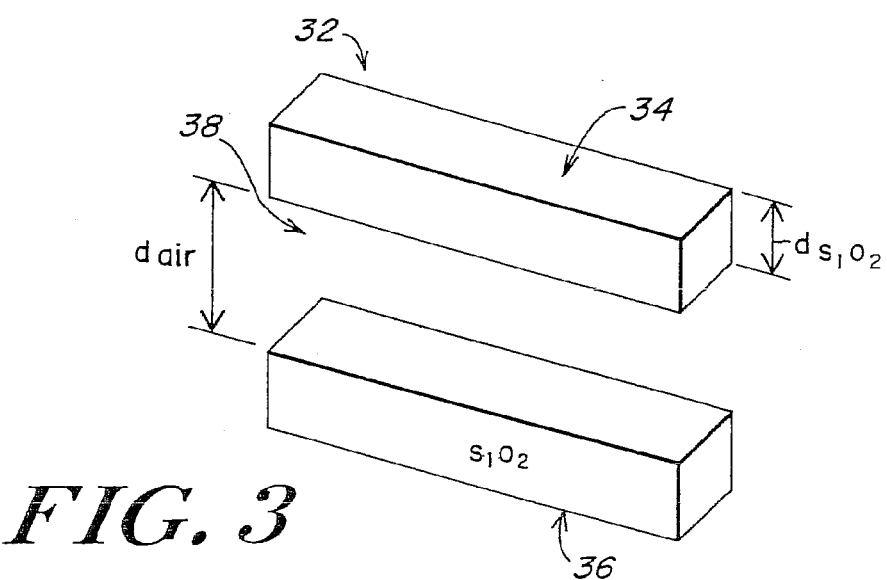
FIG. 3 is schematic diagram of a hollow filter in accordance with the invention.

FIG. 3 is schematic diagram of a hollow filter 32 in accordance with the invention. The invention allows the formation of novel optical structures. One such structure is the hollow filter 32. The hollow filter 32 includes a first high refractive index layer 34, a second high refractive index layer 36, and a gap region 38. In this embodiment, the first high refractive index layer 34 and second high refractive index layer 36 are comprised of silicon dioxide layers, however, other high refractive index materials can be used in accordance with this invention. The hollow filter 32 operates by receiving an electromagnetic wave, and filters out certain frequencies of that electromagnetic wave.

The hollow filter 32 is not attainable under prior art techniques, because of the difficulty in fabrication. The hollow filter 32 is developed using the same techniques discussed above regarding FIGS. 1A-1D. The only difference is that the hollow filter 32 does not form a defined hermetic structure, as discussed with reference to FIGS. 2A-2B. The hollow filter 32 is designed to be a structure, which has a length that is significantly longer then that of the optical structures 20 and 30. The first high refractive index layer 34 is essentially parallel to the second high refractive index layer 36. The air gap 32 is also significantly longer length wise, as compared to the air gaps 22 and 26. This would make the hollow filter 32 useful in high yield situations.

The thickness $d_{SiO_2}$ of the first high refractive index layer 34 and second high refractive index layer 36 is defined to be one quarter of the wavelength of interest, and the width $d_{air}$ of the air gap is defined to be half a wavelength. These dimensions of the hollow filter 32 can be varied. Due to the index of refraction contrast between air and the high refractive index layers 34 and 36, the reflectivity of the structure 32 is strongly modulated.

The thickness of the high refractive index layers 34 and 36 can be controlled by the amount deposited on the substrate 6 by the PECVD process. The thicker the high refractive index layers 34 and 36 are the higher the frequency that is filtered from an electromagnetic wave. Also, the air gap 38 is free from impurities and water molecules. The prior art techniques would not have been able to maintain an air gap of such length without increasing the risks that impurities and water molecules will enter the air gap 38, thus hindering the performance of such an optical structure.

Figure 4A:
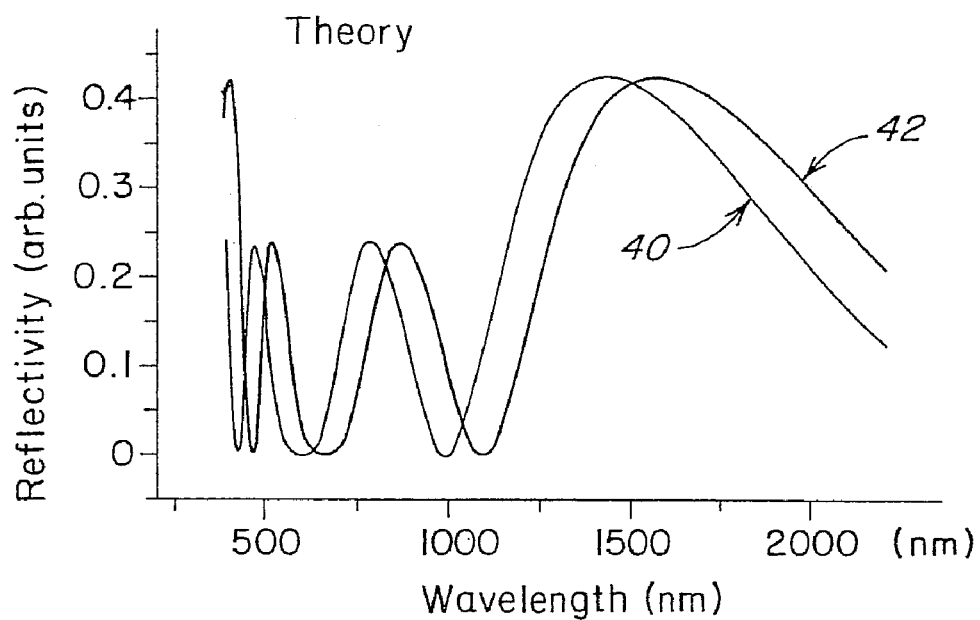
FIGS. 4A–4B are graphical representations of the theoretical and experimental responses of the hollow filter of FIG. 3.
Figure 4B:
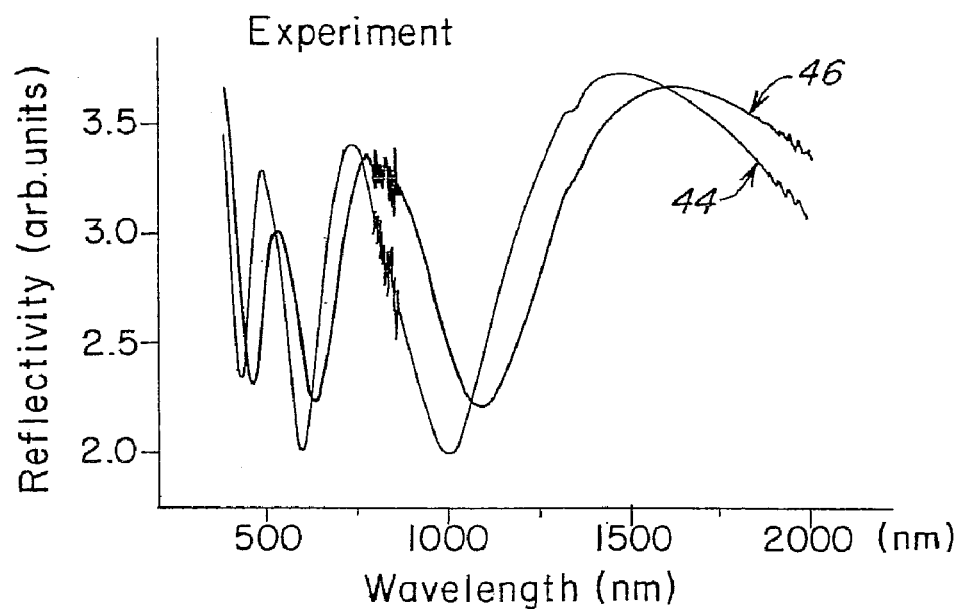

FIGS. 4A-4B are graphical representations of the theoretical and experimental responses of the hollow filter 32, which has dimensions comparable to optical structures 20 and 30. FIG. 4A represents the theoretical responses for two hollow filters 40 and 42. Filter 40 has its two high refractive index layers sized at a thickness of 200 nm and an air gap width of 450 nm. Filter 42 has its two high refractive index layers sized at a thickness of 220 nm and an air gap width of 495 nm. The theoretical responses are graphed with a vertical axis representing reflectivity measured in arbitrary units, and a horizontal axis representing wavelength measured in nanometers.

FIG. 4A demonstrates that at a wavelength of about 1500 nm the filters 40 and 42 have the highest reflectivity, and at 1000 nm, both of the filters 40 and 42 are at their minimum reflectivity, in this case approximately zero reflectivity.

FIG. 4B represents the experimental results obtained for filters 40 and 42. The experimental result 44 is the result attained after experimentation on the filter 40, and experimental result 46 is the results attained after experimentation on the filter 42. At 1000 nm, the experimental results 44 and 46 are at their respective minimum values. Also, at approximately 1500 nm, the experimental results 44 and 46 are at their respective maximums of approximately 3.7 arbitrary units.

These experimental results 46 and 44 are closely tied to their respective theoretical counterparts 40 and 42, and are within a range of statistical reliability. The theoretical results 40 and 44 and experimental results 44 and 46 are almost identical in range between 1000 nm and 1500 nm. Prior art techniques for fabricating would have never achieved such results as shown in the experimental results 44 and 46, due in part because of the stress produced in the high refractive index layers by fabrication.

The invention allows for other types of optical structures to be formed for total light switching, waveguiding of light, filters formed with very low number of filters, and 3D photonic band gaps. These optical structures can be monolithically integrated into Si, allowing for microphotonic applications, such as telecom, free space, and planar optical components.

Although the present invention has been shown and described with respect to several preferred embodiments thereof, various changes, omissions and additions to the form and detail thereof, may be made therein, without departing from the spirit and scope of the invention.

What is claimed is:

1. An optical structure comprising:
    a substrate;
    a first layer of high refractive index material that is formed on said substrate;
    a sacrificial layer that is formed on said first layer comprising a material composition of polyoxymethylene, said material composition comprising a mixture of heated trioxane and nitrogen gas that is passed to a heated filament array; and
    a second layer of high refractive index material that is formed on said sacrificial layer;
    wherein at predefined temperature said sacrificial layer is decomposed into a formaldehyde gas that escapes from said second layer leaving behind an air gap between said first layer and said second layer.

2. The optical structure of claim 1, wherein said first layer comprises a silicon dioxide layer.

3. The optical structure of claim 1, wherein said second layer comprises a silicon dioxide layer.

4. The optical structure of claim 1, wherein said air gap is hermetically closed at said predefined temperature.

5. The optical structure of claim 4, wherein said air gaps prevents penetration of impurities that hinder performance of said optical structure.

6. A method of forming an optical structure, said method comprising:
    providing a substrate having two side surfaces;
    forming a first layer of high refractive index materials on said substrate using a hot filament chemical vapor process comprising polyoxymethylene;
    forming a sacrificial layer on said first layer;
    forming a second layer of high refractive index materials on said sacrificial layer;
    decomposing at a predefined temperature said sacrificial layer into a formaldehyde gas that leaves through said second layer, and
    forming an air gap between said first layer and said second layer.

7. The method of claim 6, wherein said first layer comprises a silicon dioxide layer.

8. The method of claim 6, wherein said second layer comprises a silicon dioxide layer.

9. The method of claim 6, wherein said air gap is hermetically closed at said predefined temperature.

10. The method of claim 9, wherein said air gaps prevents penetration of impurities that hinder performance of said optical structure.

11. The method of claim 6 further comprising attaching a modulator to said optical structure, said modulator deforming said air gap to dynamically alter the performance of said optical structure.

12. The method of claim 6, wherein said sacrificial layer is partially decomposed, such that said partial air gap is trimmed to meet a certain optical specification.

13. A hollow filter comprising:
    a first elongated high refractive index layer;
    a sacrificial layer that is formed on said first elongated high refractive index layer and comprising a material composition of polyoxymethylene, said material composition comprising a mixture of heated trioxane and nitrogen gas that is passed to a heated filament array; and
    a second high refractive index layer that is formed on said sacrificial layer;
    wherein at a predefined temperature said sacrificial layer is decomposed into a formaldehyde gas that escapes from said second high refractive index layer leaving behind an elongated air gap structure between said first elongated high refractive index layer and said second high refractive index layer, said filter is designed for filtering out electromagnetic signals of a specified frequency.

14. The optical structure of claim 13, wherein said first layer comprises a silicon dioxide layer.

15. The optical structure of claim 13, wherein said second layer comprises a silicon dioxide layer.

* * * * *

UNITED STATES PATENT AND TRADEMARK OFFICE
CERTIFICATE OF CORRECTION

| | | |
|---|---|---|
| PATENT NO. | : 7,227,678 B2 | Page 1 of 1 |
| APPLICATION NO. | : 10/179055 | |
| DATED | : June 5, 2007 | |
| INVENTOR(S) | : Loo et al. | |

It is certified that error appears in the above-identified patent and that said Letters Patent is hereby corrected as shown below:

Please insert the following sponsorship Information at column 1, line 7

--This invention was made with government support under Grant No. F19628-00-C-0002, awarded by the US Air Force. The government has certain rights in this invention.--

Signed and Sealed this

Nineteenth Day of April, 2011

David J. Kappos
*Director of the United States Patent and Trademark Office*